United States Patent [19]

Sudo

[11] 3,853,661

[45] Dec. 10, 1974

[54] METHOD OF PRODUCING PLASTIC BAGS

[75] Inventor: Michio Sudo, Tokyo, Japan

[73] Assignee: Mitsubishi Yuka Kabushiki Kaisha, Tokyo, Japan; a part interest

[22] Filed: Apr. 24, 1972

[21] Appl. No.: 247,146

[30] Foreign Application Priority Data
May 10, 1971 Japan................................ 46-29241
May 10, 1971 Japan................................ 46-30490
May 13, 1971 Japan................................ 46-31587

[52] U.S. Cl.................... 156/244, 156/500, 264/94, 264/99, 264/173, 264/176 R
[51] Int. Cl. ............................................. B29c 17/00
[58] Field of Search ........... 156/156, 229, 244, 500; 264/176 R, 88, 93, 94, 95, 96, 98, 99, 173, 177 R; 425/109, 114, 131, 133, 325, 462, 463

[56] References Cited
UNITED STATES PATENTS
2,753,596  7/1956  Bailey................................ 156/244
3,051,989  9/1962  Mercer.............................. 156/500
3,354,506  11/1967  Raley................................. 425/133
3,370,999  2/1968  Schwarzrock..................... 264/95
3,394,433  7/1968  Houvener......................... 425/133
3,520,966  7/1970  Soffiantini......................... 425/133
3,649,143  3/1972  Papesh et al..................... 425/114
3,726,743  4/1973  Reifenhauser et al............. 156/229
3,758,354  9/1973  Sukurai et al..................... 264/95

Primary Examiner—Charles E. Van Horn
Assistant Examiner—Caleb Weston
Attorney, Agent, or Firm—Michael S. Striker

[57] ABSTRACT

This invention relates to a method of producing plastic bags made of cylindrical film which is manufactured by the well known method called the "inflation method," being improved and characterized in forming film in layers which are crossed in their stretched directions by using a compound die assembled with a plurality of annular dies concentrically.

10 Claims, 5 Drawing Figures

A METHOD OF PRODUCING PLASTIC BAGS

BACKGROUND OF THE INVENTION

It is well known that when heated plastic resin is expanded, the material is apt to be oriented in the direction of being stretched to increase its tensile strength toward the orientation, so that in case the material is stretched in both directions of length and breadth at the same co-efficient of stretch, the strength of the material tends to be increased in any directions.

The packing bags made of polyethylene of low density of molecules, for packing heavy fertilizer, are manufactured by the "method of inflation" which makes a cylindrical film. For example, to make a bag for fertilizer of 25 Kg., a cylindrical film of 450 to 500 mm in diameter and 0.2 mm in thickness is formed by an annular die having a slit whose diameter is 250 mm and its width is 1.00 mm. The co-efficient of the lengthwise stretch of the cylindrical film is 1.0 mm/0.2 mm = 5, while that of transverse stretch of the film is 2 × (450 to 500)mm/3 × 250 ÷ 1.3.

Accordingly, it is clear that the former is larger than the latter, namely, the lengthwise stretch is about four times as great as the transverse one. For the purpose of increasing the transverse stretch of the flattened cylindrical film, it is necessary to form such a film of 0.2 mm in thickness, by welding two cylindrical films crosswisely. Thus formed stratified film is well known to be strong enough for packing any kind of heavy materials.

To manufacture above mentioned strong bags several troublesome steps are necessary such as gluing two flattened cylindrical films crossing in lengthwise directions to each other with paste; cutting the films in desired length; folding back the cut film along its center line; sticking the edges opposite the center line so as to form a tube; and forming a bottom to make a bag from the tube. For the purpose of utilization of the method, our invention is to provide a novel method and apparatus.

SUMMARY OF THE INVENTION

The object of the invention is to provide a method for manufacturing flatten cylindrical film of heat-plastic resin in layers stretched and stuck one over the other. Before the cylindrical films are flattened and stuck together a bubble of melted plastic resin is expanded by the "method of inflation" so that the layers of film may be contacted or welded with each other. The bubbles are extruded concentrically through annular gaps formed between two annular dies when one of the dies rotates or both dies rotate in reverse directions.

One die is inserted in a space of another die and each die is provided with a feeding opening for melted resin and communicated with an extruding machine having two extruding openings for the same kind of material, or communicated with two extruding machines for the different kinds of materials.

Another object of the invention is to provide for manufacturing flattened cylindrical film of heat-plastic resin in layers stretched and connected one over the other. Before the cylindrical films are flattened bubbles of melted plastic resin are expanded by the "method of inflation" so that the layers of film may be contacted or welded with each other. The bubbles are extruded through each annular gap formed in three annular dies, two of which are rotated so that the stretched directions of layers of film may cross each other during the time the resin is extruded. A resin-feeding opening of one of the dies is communicated with an extruding machine for supplying with low-heat-plastic resin, and the rotation of this die is stopped when the resin is extruded. The other two resin-feeding openings of the other dies are respectively communicated with one or two extruding machines which is or are supplied with similar or different kinds of heat-plastic-resin. The three annular dies are assembled with the annular inner die inserted in a space of a middle annular die which in turn is inserted in a space of the other annular die.

Before the film is pressed and flattened, two kinds of resin are extruded so as to form two kinds of bubbles through annular gaps of outer and inner annular dies, and both bubbles are formed in cylindrical bubbles, both of which are contacted by the method of inflation. The bubble at the outer side is cooled by a cooling medium to a certain degree while the inner one may not become solidified. The two kinds of resin are extruded by the rotation of the annular die for outer layer of film. In a space of the rotatable annular die for the outer layer of film, another annular die for the inner layer of film is inserted, of which resin-feeding opening is communicated with an extruding machine in which low-heat-plastic resin is supplied, while the annular die for the outer layer of film is also provided with a resin-feeding opening which is communicated with an other extruding machine in which another kind of heat-plastic-resin is supplied.

DETAILED DESCRIPTION OF THE INVENTION

For a more particular description of the invention, reference is to be had to the accompanying drawings, forming a part thereof, in which.

In an example (1) of the first embodiment, polyethylene of high density of molecules is supplied to an extruding machine (not shown in drawings) having two discharging openings for melted resin with which, the apparatus of the invention is communicated.

Figure 1:
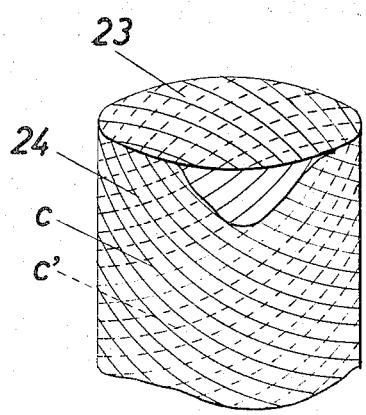
FIG. 1 is a perspective view illustrating stratified film formed by an embodiment of the invention.
Figure 2:
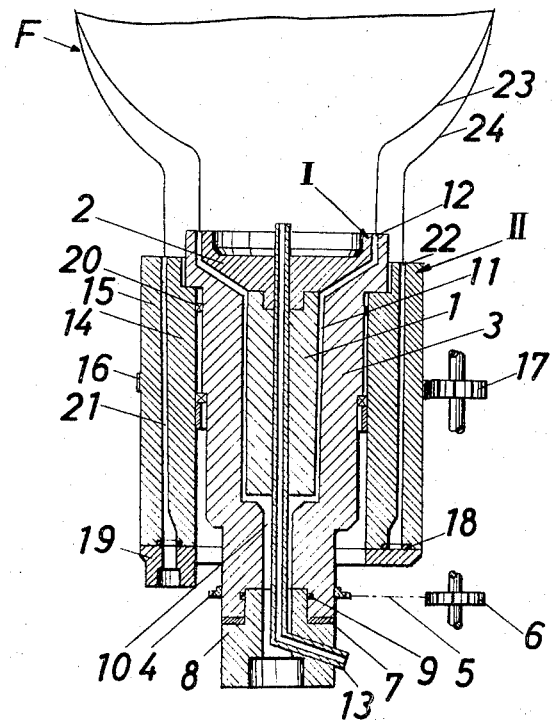
FIG. 2 is a vertical cross sectional view of the apparatus for manufacturing the stratified film illustrated in FIG. 1.

As shown in FIG. 2, inside of an annular outer die II for forming film of an outer layer is provided a space into which an annular inner die I for forming film of an inner layer is inserted so as to rotate in reverse directions with each other.

To the top of an inner shaft 1 of the inner die I, an inner member 2 is fixed, around of which is provided an inner cylinder 3, to the lower portion of which a gear wheel 4 is fixed which is driven through a chain 5 by a driving means 6 so as to rotate the inner die I for forming film of an inner layer, which inner disc comprises the inner member 2 and the inner cylinder 3. To the bottom of the cylinder 3 is fitted, through a packing 7, a feeding means 8 for introducing resin. Between the feeding opening 8 and the inner cylinder 3 is arranged a bearing 9 for rotation. Melted resin supplied from an extruding machine is extruded out of an upper annular gap 12 through the stationary feeding opening 8, a guide aperture 10 which is formed along the axis of the inner cylinder 3 and a guide gap 11 formed between the cylinder 3 and the inner member 2. The fixed feeding opening 8 is provided with an air-tube 13 which is centrally through the inner die I and through the guide aperture 10 and along the axes of the inner shaft and inner member 2.

In the annular outer die II for forming film of an outer layer, around an outer member 14 is provided with an outer cylinder 15 to which a gear wheel 16 is fixed which is driven by a driving means 17 so that the outer die II may be rotated.

With the bottom of the outer member 14 and of the outer cylinder 15 is fitted through a packing 18 a fixed feeding opening 19 for feeding-resin. Between the inner cylinder 3 and the outer member 14 is provided a bearing 20 for supporting the outer die II. Melted resin is extruded out of an upper annular gap 22 through the feeding opening 19 and a guide gap 21 which is formed between the outer cylinder 15 and the outer member 14.

For the purpose of manufacturing the stratified cylindrical film F, feeding openings 8, 19 for feeding resin, of the dies I, II for forming cylindrical stratified film, are communicated with two openings for extruding resin, of the extruding machine. To determine the thickness of film, a proper speed (a) to pull out the film is chosen in accordance with the diameters and the widths of gaps 12, 22 of the dies I, II respectively and by the diameter of screw of the extruding machine. And the air is blown into the air tube 13 by which the diameter of the cylindrical film is made as desired. In case the dies I, II are rotated in reverse directions at the same speed (b) as the speed (a) of pulling out the film by the driving means 6, 17 through the gear wheels 4, 16 fixed to the outer walls of the outer cylinders 3, 15 respectively, the resin extruded from the gap 12 is stretched in the direction (c) at an angle of 45° in relation to the vertical line of the graph (FIG. 3A), since the dies I, II rotate in reverse direction to each other, the stretched direction of each cylindrical film 23, 24 is crossed. The inner bubble 23 is expanded to a certain size of desired diameter by the air blown thereinto through the air tube 13, so that the outer bubble 24 is pressed outwardly to be also expanded and welded concentrically with the outer bubble without leaving any space therebetween so as to form a sheet of stratified film F which seems just like a conventional film of single layer.

In another example 2 of the first embodiment, polyethylene of high density of molecules is supplied by one extruding machine of which the extruding opening is communicated with the fixed feeding opening 8 of the inner die I for forming the stratified cylindrical film, while polypropylene is supplied by an other extruding machine of which the extruding opening is communicated with the fixed feeding opening 19 of the outer die II. Similarly to the example 1, the resin of polypropylene extruded in the direction at an angle of 45° in relation to the vertical line of the graph, is formed for an outer layer of film and the resin of polyethylene of high density stretched crosswisely with the outer layer, is formed for inner layer of film so as to be contacted concentrically with each other to make the stratified film (F).

In another example 3 of the first embodiment, polyethylene of high density of molecules is supplied by one extruding machine to be extruded through the gap 12 of the inner die I which is held stationarily, so that the material is stretched only in the vertical direction of pulling out, while polypropylene is supplied to the other extruding machine to be extruded through the slit 22 of the outer die II which is rotated in a high speed so that the resin may be stretched in the direction at an angle of 80° in relation to the vertical line of the graph so as to be crossed with the vertically stretched inner layer of film and to form the stratified film (F).

The following list shows the examined values of each product manufactured by the method in two cases of producing a sheet of startified film having a similar thickness of both inner and outer layers of 0.06 mm, comparing the substantial characteristics of each.

| Substantial Characteristics | Products & Materials | Ex. (1) of 1st Embodiment inner layer of H.D.P.E. outer layer of H.D.P.E. 0.06mm thick each | Ex. (1) of 1st Embodiment similar to the left, but dies being stopped | Ex. (2) of 1st Embodiment inner layer of H.D.P.E. outer layer of P.P. 0.06mm thick each | Ex. (2) of 1st Embodiment similar to the left, but dies being stopped | Ex. (3) of 1st Embodiment inner layer of H.D.P.E. outer layer of P.P. 0.06mm thick each |
|---|---|---|---|---|---|---|
| Stretched strength Kg./Cm² | Length | 380 | 300 | 420 | 340 | 400 |
|  | Lateral | 375 | 250 | 410 | 260 | 380 |
| Elasticity % | Length | 14.5 | 8.0 | 14.0 | 7.0 | 12.5 |
|  | Lateral | 14.8 | 4.1 | 13.5 | 3.6 | 11.6 |
| Impact strength gr. by dart-dropping test |  | 1500 | 160 | 1470 | 130 | 1380 |
| Seal strength Kg./2Cm. width |  | 0.4 | 0.3 | 0.3 | 0.3 | 0.3 |

NOTE:
H.D.P.E. = Polyethylene of high density of molecules (used ZY-40 of Mitsubishi Yuka Co., Ltd.)
P.P. = Polypropylene (NOBREN made by the above company)

As shown above, it may be understood that the elasticity and impact value are excellent, namely, the latter is obtained about ten times value of the film which is formed without stretching in the diagonal direction by the method of no rotation of the die without conforming to the speed of pulling off the film, and the elasticity is increased about two or three times of the film mentioned as above. Since the stretched strength is increased in any direction, the product is suitable for packing heavy materials and it is found that the product having one half of the thickness of the film of single layer can be employed for packing the same heavy weight of materials.

In the prior art, to stratify two sheets of film crossing each stretching direction, two flattened sheets have been generally stuck, further sticking another one over a vertical drum of film to strengthen the bag for heavy material. But in that method many troublesome steps are necessary, while in this embodiment of the present invention, two annular dies are assembled concentrically so as to rotate in reverse directions or to stop rotating of one of the dies so that each stretching direction of two sheets of film may cross each other to be connected and stratified by the method of inflation and to form cylindrical film of which layers are crossed in their stretching directions. The steps of forming the film into bags are similar to those of making bags in the prior art by using the film formed by the method of inflation.

As mentioned above, in case to stratify the sheets of film made of different kinds of heat-plastic-resin, the operation of inflation should be controlled so as to change the rate of elasticity according to the quality of resin, so that the strength of both length and breadth of the stratified film may become average so as to increase the composite strength. In case one layer of film is superior in its quality than the other layer to be stratified, the die for the former resin is stopped or is rotated very slowly according to the quality.

In an Example 1 of the second embodiment, this structure is based on the first embodiment to which one more annular die is employed which is provided between the inner and the outer dies to extrude three layers of film which are worked by the inflation method to obtain a unificated stratified film.

Figure 3A:
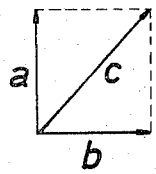
FIG. 3A and FIG. 3B are respectively illustrating dynamically the stretching directions of inner and outer layers forming the stratified film shown in FIG. 1.
Figure 3B:
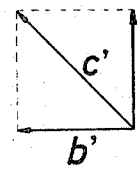
Figure 4:
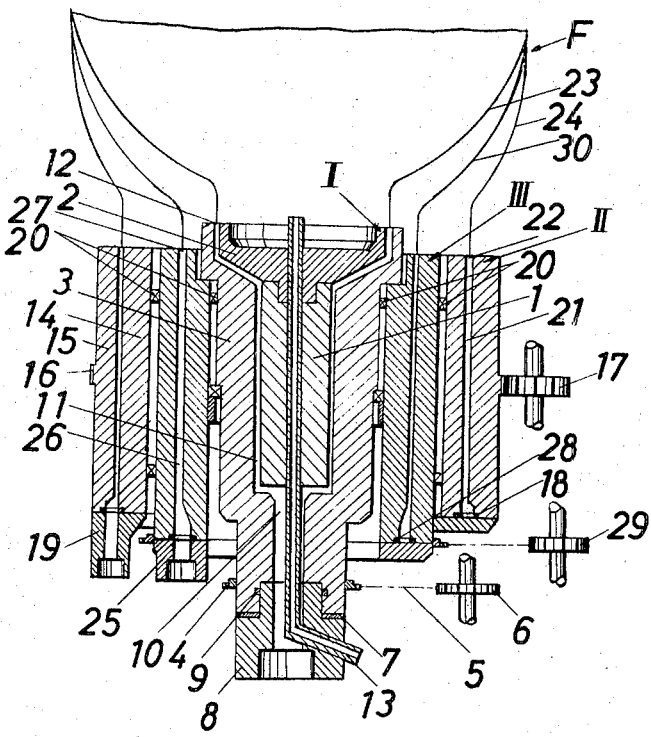
FIG. 4 is a vertical cross sectional view of another embodiment of the invention for manufacturing the stratified film.

In FIG. 4, to make understanding easier, the referred numbers in FIG. 3 are used.

Between the outer annular die I and the inner annular die II is inserted an intermediate die III. At the bottom of these dies are fixed feeding openings 8, 19, 25 for feeding resin, above of which the annular dies I, II, III having guide gaps 11, 21, 26, annular gaps 12, 22, 27 are arranged through packings 7, 18, 28 so as to be rotated by driving means 6, 17, 29 respectively. The feeding openings 8, 19 of the inner and outer dies I, II are communicated with an extruding machine which is supplied with polyethylene of high density, and the feeding opening 25 of the intermediate die III is communicated with another extruding machine which is supplied with polyethylene of low density. The inner and outer dies I, II are rotated in reverse directions by the driving means 6, 17 and the intermediate die III is held without rotation so that the resin may be extruded from gaps 12, 22, 27 of each die communicated with respective extruding machines. When a desired quantity of air to form the necessary diameter of prospective flattened film is blown into an inner bubble 23 to be expanded so that middle and outer bubbles 30, 24 may be pressed and expanded. Then, these bubbles are stretched so as to be contacted closely with each other. The stretched directions of inner and outer layers of film are crossed with each other, of which directions (c) or orientations are as shown in FIGS. 3A and 3B, diagonal lines between the speed of stretching of flim and that of rotation of each die I, II. Between the above mentioned layers of film is stuck the middle layer made of polyethylene of low density of molecules having a low-heat melting point. Thus, stratified film having inner and outer layers of which the stretched directions are crossed with each other, and having a middle layer stuck between the two, is formed.

In another example 2 of the second embodiment, the structure of the example 1 is employed in which the feeding openings 19, 25 of the outer and intermediate dies II, III are communicated with extruding machines respectively which are supplied with polyethylene of high density for making the outer layer and with polypropylene for the middle layer respectively, while the feeding opening 8 of the inner die I is communicated with another extruding machine which is supplied with polyethylene of low density having low heat melting point. The outer and intermediate dies are rotated in reverse directions but the inner die I is stopped so that the two kinds of resin for forming outer and middle layers of film extruded from the gaps 22, 27 may cross each other in the stretching direction but the resin extruded from the gap 12 may form the inner layer of film. Thus, the stratified film (F) can be obtained.

In further example 3 of the second embodiment, polyethylene of high density is supplied for forming the outer and middle layers of film and the outer die II is rotated faster than the speed of stretching the film while the middle die III is rotated very slowly or stopped. For forming the inner layer of film the inner die is supplied with polyethylene of low density and is stopped. From the gaps 12, 22, 27, of the dies I, II, III, each resin is extruded so as to manufacture the stratified film of which the orientations of the outer and middle layers of film are crossed.

The following list shows the tested values of the products made by the method in such cases as examples 1, 2, 3, of the second embodiment, and the first and second embodiments comparing the substantial characteristics of the products. The first embodiment in the list is the same as the example 1 with reverse rotation of dies thereof, but the second embodiment of the last column in the list, the products and materials are similar to those in the second column of the following list but dies are remained without rotation.

| | | Ex. (1) of 2nd Embodiment | Ex. (2) of 2nd Embodiment | Ex. (3) of 2nd Embodiment | 1st Embodiment | 2nd Embodiment |
|---|---|---|---|---|---|---|
| | Products & Materials | inner layer of H.D.P.E. outer layer of H.D.P.E. middle layer of L.D.P.E. 0.04mm thick each 0.12mm thick total | inner layer of L.D.P.E outer layer of H.D.P.E. middle layer of P.P 0.04mm thick each 0.12 mm thick total | inner layer of L.D.P.E. outer layer of H.D.P.E. middle layer of H.D.P.E. 0.04mm thick each 0.12mm thick total | inner layer of H.D.P.E. outer layer of H.D.P.E. 0.06 mm thick each 0.12mm thick total | inner layer of L.D.P.E. outer layer of H.D.P.E. middle layer of P.P 0.04mm thick each 0.12mm thick total |
| Substantial Characteristics | | | | | | |
| Stretched strength | Length | 365 | 390 | 360 | 380 | 330 |

|  | Ex. (1) of 2nd Embodiment | Ex. (2) of 2nd Embodiment | Ex. (3) of 2nd Embodiment | 1st Embodiment | 2nd Embodiment |
|---|---|---|---|---|---|
| Products & Materials Substantial Characteristics | inner layer of H.D.P.E. outer layer of H.D.P.E. middle layer of L.D.P.E. 0.04mm thick each 0.12mm thick total | inner layer of L.D.P.E outer layer of H.D.P.E. middle layer of P.P 0.04mm thick each 0.12 mm thick total | inner layer of L.D.P.E. outer layer of H.D.P.E. middle layer of H.D.P.E. 0.04mm thick each 0.12mm thick total | inner layer of H.D.P.E. outer layer of H.D.P.E. 0.06 mm thick each 0.12mm thick total | inner layer of L.D.P.E. outer layer of H.D.P.E. middle layer of P.P 0.04mm thick each 0.12mm thick total |
| Kg./Cm² Lateral | 360 | 380 | 340 | 375 | 305 |
| Elasticity Length | 15.1 | 14.5 | 13.0 | 14.5 | 6.2 |
| % Lateral | 14.8 | 14.0 | 11.5 | 14.8 | 4.3 |
| Impact strength gr. by dart-dropping test | 1630 | 1520 | 1370 | 1500 | 200 |
| Seal strength Kg./2 cm.width | 4.2 | 4.1 | 4.15 | 0.4 | 4.0 |

NOTE:
L.D.P.E. = Polyethylene of low density of molecules (used ZE-32 of Mitsubishi Yuka Co., Ltd.)
H.D.P.E. = Polyethylene of high density of molecules
P.P.     = Polypropylene
Ex. (3): outer film is stretched
1st Embodiment: each stretched and crossed
2nd Embodiment: no stretched each It may be clear in the above list by comparing the film of the same thickness that the substantial characteristics are so much improved as following:

1. IMPACT STRENGTH INCREASED: The stratified annular film of which layers are stuck concentrically, two of which are crossed in their stretching directions, has about 10 times the strength of the product shown in the first embodiment without rotation of dies and without orientation of film, besides the improvement on the stretched strength and elasticity. So, it is possible to decrease the thickness so far as no troubles happen to handle the heavily packed bags. It is testified that no difference in the effect whether the layer of film of no orientation having a low-heat point of welding, may be arranged between the two layers crossed in stretching direction, or on either side of the two crossed layers.

2. SEAL STRENGTH INCREASED: As seen in the example 1 of the second embodiment in which two cylindrical layers of film are crossed in their stretching directions and stuck concentrically with another cylindrical layer of film made of low heat weldable plastic resin, the seal strength is more than 10 times of that of film as shown in the example 1 of the first embodiment in the first list in which having no crossed stretched layers of film. One of the objects of this invention is to increase the seal strength. When the layer of film having no crossed stretched directions is to be sealed, it is heated to be melted at first, and then becomes a medium to weld another layer of which branches of moleculars infiltrate into the medium to be welded, so that it can be put on any position adjacent the two layers of film having crossed orientation without different effect as mentioned above. Instead of polyethylene of low density, such plastic resin having low-heat melting point and weldability as copolymer of ethylene and vinyl acetate, copolymer of ethylene and ethyle acrylate, polycarbonate, vinyl chloride or vinylidene chloride can be used for connecting the film having orientation.

These kinds of materials when used for forming a layer of film is not necessary to be stretched by rotating an annular die, because, if this layer of film stretched, the stretched portion will be piled upon one of the crossed stretching layers of film so as to form an unbalanced stratified film. According to such conditions as materials to be packed and to be kept, certain kinds of resin are selected and assembled to form layers of film by the inflation method in which annular dies are rotated in reverse directions to each other so as to cross the orientations of layers by which substantial characteristics are increased, especially impact strength is increased so that the field of utilization of the bags made of heat-plastic resin may be wider than before when they were used for damp-proofing.

Further, since the stratified film having enough seal strength can be manufactured by using low-heat plastic resin which is not necessary to be stretched with orientation. If such kinds of resin are selected and assembled so as to be met the requirements of such uses of the bags as for packing material which are required to be of thermal resistance, cold resistance, oil resistance and air tightness, the field of utilization of the bags will be spread over a field which has been prevented from use of the bags hitherto, without any troubles of bad sealing of the assembled layers of film.

In the present invention, the method of forming stratified flattened film directly by the inflation method, is included. In this method, a cylindrical film is pressed and flattened by a nip-roll to form the cylindrical film in layers each of which orientation is crossed, being stuck to each other. Before the cylindrical is pressed and flattened, two kinds of resin are extruded so as to form two kinds of bubbles through each gap of outer and inner annular dies, and both kinds of bubbles are formed in cylindrical bubbles, both of which are contacted closely each other by the inflation method. The bubble at the outer side is cooled by a cooling medium to a certain degree so that the inner one may not become solidified. The two kinds of resin are extruded by the rotation of the annular die for the outer layer of film. In a space of the rotatable annular die for outer layer of film, another annular die for inner layer of film is inserted, of which resin-feeding opening is communicated with an extruding machine to which low-heat plastic resin is supplied, while the annular die for outer layers of film is also provided with a resin feedig opening which is communicated with an other extruding machine to which another kind of heat-plastic resin is supplied.

THE THIRD EMBODIMENT: For this embodiment the apparatus described in connection with FIG. 2 may be used in which, however, the inner annular die I has no driving means to be rotated but the outer annular die II is rotatable, of which the resin-feeding opening 19 is communicated with an extruding machine which is supplied with polyethylene of high density (being employed EY-40 made by Mitsubishi Yuka Co., Ltd.), and the resin-feeding opening 8 of the inner annular die II is communicated with an other extruding machine which is supplied with polyethylene of low density (being used ZE-32 made by Mitsubishi Yuka Co., Ltd.). Each kind of resin being heated to necessary degree for each, is extruded through the gaps 12, 22 of the dies I, II respectively by the rotation of a screw so that the polyethylene of high density may become on outer bubble and that of low density may be an inner one. Air is blown into the inner bubble 23 so that the diameter may be of necessary size. And the desired speed of stretching the film is obtained as mentioned so that the thickness of the film may be set up. The outer annular die II is driven by the driving means 17 to be rotated at the same speed as that of stretching film.

To manufacture a sheet of stratified flat film, the inflation method is employed in which:

The outer layer of film 24 is stretched in the direction of a diagonal line at 45° between the speed of stretching the film and that of rotation, and the inner layer of film 23 being expanded and pressed outwardly so that both bubbles may be closely contacted. The outer cylindrical bubble is cooled by cooling air medium and becomes about 110°C at the position of the nip-rolls by which the bubbles are pressed and flattened, so that the opposite inside of the cylindrical inner film 23 is contacted with the outer film. On both outer sides of the flattened film are covered by the outer layer of polyethylene of high density which is stretched and inclined at 45° so as to form stratified film stuck with both inner layer of polyethylene of low density and outer layer of polyethylene of high density. As to the flattened outer layer covering both sides of flattened film, when it is extruded in cylindrical shape from the annular die which is rotated in a constant speed, it is stretched in a inclined direction relative to the vertical line, so that in case it is flattened, the covering film on opposite sides of the flattened inner film become two sheets of layer of which inclined directions are crossed. By changing the speed of rotation of the annular die II the inclined angle can be changed freely, accordingly, by making the speed of rotation similar to the speed of stretching the film, the inclined angle can be changed into 45°, so that the stretching directions of the outer layers of the outer film to be stuck to the inner film, are crossed. The stratified film thus made, is preferred because of its averaged strength to any directions. The inner bubble 23 of polyethylene of low-heat plastic resin of low density extruded from the gap 12 of the annular inner die I is contacted with the outer bubble of polyethylene of high density which being extruded from the gap 22 of the annular outer die II is contacted with the inner bubble, by the inflation method, so that the layers are perfectly connected to each other.

To manufacture bags from the mentioned flattened films, the heat-sealing method is employed, in which the necessary portion of the film is heated and pressed by a seal band machine so as to be stuck solidly with the resin having a low-heat point which works as a medium. This operation is much easier than that of making bags from conventional stratified film using a binding agent, as such bags cannot be made without a binding agent. In case of pressing layers of film by a nip-roll just before the inner film becomes solidified by cooling after inflation, the outer film which has a higher heat welding point than the inner one, the outer film will not stick to the nip-roll at the temperature just before the inner film being solidified because the former has a high heat welding point though the latter is stuck with each other easily. By using the resin having a heat-welding point for the inner film lower than that of the outer film, the inner film is formed into a sheet of flat film, so that the effect of connecting four sheets of film is similar to the case in which three sheets of film are connected. During the inflation method, by rotating the outer annular die for forming the outer cylindrical film, and it is flattened into a flat film by a nip-roll, so as to make a film of which outer two layers are crossed in their stretching directions. By employing these steps, the troublesome steps of the prior art are avoided. For an outer layer, such heat plastic resin is used as polyethylene of high density, polypropylene, polycarbonate and saran, and for an inner layer, such heat plastic resin having a lower heat-melting point and of weldable as polyethylene of low density, ethylene-vinyl acetate copolymer, ethylene-ethyl-acritate copolymer, vinyl chloride is used properly being united together.

It has been suggested in a conventional method for producing a stratified film that two layers of film should be crossed their stretched directions especially be crossed at right angle to be stuck to each other for the purpose of increasing the strength of the product especially the impact value. The heat plastic resin is extruded from the annular die to form a cylindrical film, which is stretched in the longitudinal direction if the speed of longitudinal stretching is fast. When this cylindrical film is cut spirally, the stretched direction of the long flat film is inclined at 45° to the vertical line. Two layers of the film are stuck by sticking medium so that each direction thereof, may be crossed each other. But this process needs troublesome steps.

While as mentioned above, in the present invention, guide openings of the annular dies which are combined concentrically, are communicated with extruding machines respectively, to which the same kind or different kinds of resin is supplied, each annular die is rotated in reverse directions at similar or different speed, or one of the dies is stopped, the melted resin extruded from the gaps of each die is expanded by the inflation method, to be stuck to each other. As the resin extruded, is stretched in a diagonal direction which is determined by the speed of rotation of the die and that of stretching the bubble of resin, in case two dies are rotated in reverse directions, the stretched directions or orientations of each film cross each other, so that it is possible to manufacture a stratified film having a strong impact strength, or, in case three annular dies are employed, one of which is stopped to extrude resin having low heat welding point, the other two of which are rotated in reverse directions, so that a stratified film having a strong impact strength can be manufactured very easily. Thus, the present invention can provide a novel method of manufacturing plastic bags.

Since certain changes may be made in the above apparatus and method without departing from the scope of the invention herein involved, it is intended that all matter contained in the above description or shown in the accompanying drawings shall be interpreted as illustrative and not in a limiting sense.

What is claimed is:

1. A method of forming plastic bags comprising the steps of extruding plastic material in molten condition through at least two concentric annular gaps formed in concentric cylindrical dies to form at least one pair of bubbles of plastic material in which one is located within the other; rotating during such extrusion at least one of said dies relative to the other; and blowing air only into said one bubble so that the whole outer surface thereof is in full contact with the inner surface of the other bubble.

2. A method as defined in claim 1, wherein both gaps are supplied with the same plastic material.

3. A method as defined in claim 1, wherein the plastice material supplied to one of the gaps is different from the plastic material supplied to the other of said gaps.

4. A method as defined in claim 1, wherein the inner of said concentric gaps is supplied with plastic material having a lower melting point than that supplied to the outer one of said annular gaps.

5. A method as defined in claim 4, and including the step of cooling the outer bubble while maintaining the inner bubble in plastic state during expansion and contacting thereof with said outer bubble, and flattening the bubbles by passing the same through the nip of a pair of rotating rolls.

6. A method of forming plastic bags comprising the steps of extruding plastic material in molten condition through at least two concentric annular gaps formed in concentric cylindrical dies to form at least one pair of bubbles of plastic material of which one is located within the other; rotating during such extrusion both dies in opposite directions; and blowing air into said one bubble to expand said one bubble into contact with the other bubble.

7. A method as defined in claim 6, wherein both dies are rotated in opposite directions at the same speed.

8. A method as defined in claim 6, wherein both dies are rotated in opposite directions at different speeds.

9. A method of forming plastic bags comprising the steps of extruding plastic material in molten condition through three concentric annular gaps formed in three concentric cylindrical dies to form three plastic bubbles of which a first one is located in a second one and the latter in the third of said three bubbles; rotating during such extrusion the outermost and the innermost of said dies in opposite directions while holding the intermediate die stationarily; and blowing air into said first of said bubbles to expand said first bubble into contact with said second bubbles and the latter into contact with said third bubble.

10. A method as defined in claim 9, wherein the gap formed in said intermediate die is supplied with plastic material having a lower melting point than the plastic materials supplied to the gaps of the other two dies.

* * * * *